March 31, 1942.  A. E. BERGSTRÖM  2,277,685
HEADLIGHT, ESPECIALLY FOR AUTOMOBILES AND SIMILAR VEHICLES
Filed Nov. 10, 1938
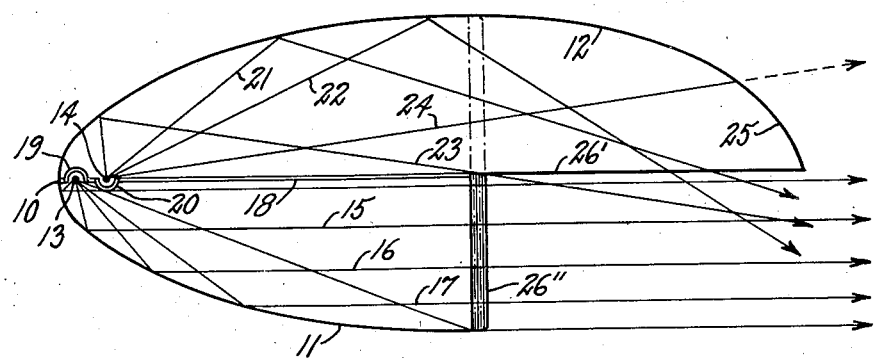
Fig. 1.
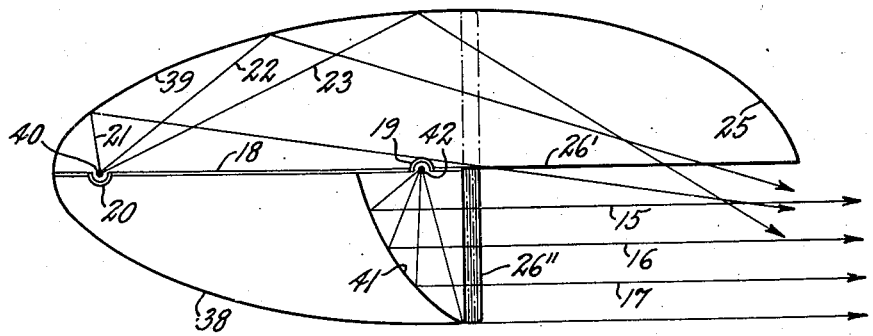
Fig. 2.
Fig. 3.
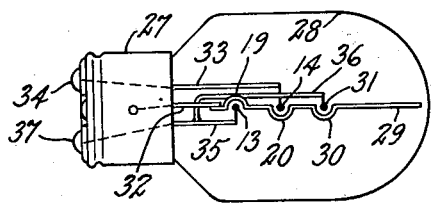
INVENTOR.
Axel Emil Bergström
BY
ATTORNEY Patented Mar. 31, 1942

2,277,685

UNITED STATES PATENT OFFICE 2,277,685

HEADLIGHT, ESPECIALLY FOR AUTOMOBILES AND SIMILAR VEHICLES

Axel Emil Bergström, Lidingo, Sweden

Application November 10, 1938, Serial No. 239,806
In Sweden November 11, 1937

4 Claims. (Cl. 240—41.25)

Headlights for automobiles and similar vehicles are as a rule made in such a way that the beam of light can be directed at two different elevations, namely, so that a good distant illumination is obtained, and so that a good adjacent illumination is obtained. The main object herewith has been, when driving at higher speed, to have the headlights so adjusted that good distant illumination is obtained, but that when meeting another car, the light may be changed to provide adjacent illumination.

Distant illumination should make it possible to not only see the road surface but also something of the surroundings above and on each side of the road surface. For instance trees, telegraph poles and the like, placed on the side of the road, give good indication of distant curves, which might otherwise be difficult to observe. For this purpose the rays from the headlight, which is provided to produce distant illumination, should radiate in such a manner that not only things below the horizontal plane through the headlights are illuminated, but that there is also a certain illumination above the horizontal plane. This last named illumination causes dazzling of approaching persons, and in this way it may cause accidents.

In order to avoid such accidents, there is therefore provided a light which is switched on instead of the distant illumination light, when meeting another vehicle. This light should be arranged in such a way that it does not illuminate any object above the horizontal plane through the headlight, and gives an even illumination of the road path immediately before the car, for instance for 50 meters.

It has been proposed to use for the adjacent illumination a headlight containing a concentrated source of light, such as an incandescent filament, surrounded by a reflector of special kind. This reflector is so formed that a vertical section through the reflector in its back part has approximately parabolic shape, whereas the shape becomes more elliptical the closer the section approaches the opening of the reflector.

The object of the present invention is a convenient and practical form of execution of a combined headlight, provided alternatively for adjacent and distant illumination, in which the adjacent illumination reflector is at least in part of the above mentioned kind.

According to the invention the reflector is divided into an upper and a lower part by a horizontal plane extending through the reflector, the upper part being provided for adjacent illumination and the lower part being provided for distant illumination. A screen is provided in connection with the upper part of the reflector for preventing light from the source which furnishes the adjacent illumination, from being radiated above the horizontal plane through the headlight. For the adjacent illumination, and for the distant illumination, respectively, there are provided different sources of light, which preferably are two incandescent filaments within a single lamp. By special screens the two incandescent filaments are screened in such a way that the filament intended for distant illumination is shielded from the part of the reflector intended for adjacent illumination, and the filament intended for adjacent illumination is shielded from the part of the reflector intended for distant illumination.

Further objects and advantages of my invention will be apparent from the following description, considered in connection with the accompanying drawing, which forms a part of this specification and of which;

Fig. 1 is a more or less diagrammatic view of one embodiment of my invention;

Fig. 2 is a similar view of another embodiment; and

Fig. 3 is a view of a multi-filament of an electric lamp in accordance with my invention.

In Fig. 1 the reflector is indicated by reference character 10. The lower part 11 of the reflector is substantially parabolic, whereas the upper part 12 of the reflector is an ellipsoid or similar thereto. The focus of the paraboloid 11 is located at 13, and the posterior focus of the ellipsoid is located at 14. In each of the foci a source of light is placed, in the following as a matter of simplicity also indicated by 13 and 14, respectively. The rays 15, 16 and 17, emanating from the source of light 13, are reflected parallel to each other due to the known properties of the parabola and produce the distant illumination. A horizontal screen 18 is disposed at the axis of the reflector, so as to separate the parabolic part 11 from the ellipsoid 12. Depressions 19 and 20 are provided in the screen 18, and the sources of light 13 for the lower part and 14 for the upper part of the reflector are arranged in these depressions. For that reason no rays from the source of light 13 reach the upper part of the reflector.

The rays, such as 21, 22 and 23, from the source of light 14 are reflected by the ellipsoid downwards against the surface of the ground and therefore provide adjacent illumination. In order to prevent rays of the type, indicated by 24, from emanating directly, that is without being reflected, and causing dazzling effects, the upper part of the reflector 12 is continued to provide a screen 25, extending down to the horizontal axial plane through the reflector. Instead of this, the shell of the headlight outside the reflector could be formed as such a screen. Between the screen 25 and the screen 18 a protecting glass 26' is provided, through which the rays from the source of light 14 pass, after having been reflected by the upper part of the reflector 12.

The rays of light, emanating from the source of light 13 and reflected by the lower part of the reflector 11, would be reflected approximately in parallel, as indicated by rays 15, 16 and 17, if the lower part of the reflector were a perfect paraboloid. This, however, would cause a rather concentrated illumination at a point a great distance from the car. On the other hand, a certain diverging of the light rays, both in elevation and laterally is desirable, but it should be observed that the lateral divergence should always be somewhat the greater of the two. Of course, this divergence can be obtained by giving the parabolic part of the reflector 11 a form which is slightly different from a true paraboloid, but it may also be effected by arranging a lens 26" before the parabolic reflector, the lens being provided with so called spray elements. If desired, both of these means may be employed for obtaining the divergence.

In order to use the greatest possible quantity of light from the sources 13 and 14, it is preferable to make at least the cup shaped depressions 19 and 20 with reflecting surfaces, or all of the screen 18 may be made reflecting, although this is not of so great importance.

A device of the kind described above gives a very good adjacent illumination when the source 14 is lighted and a very good distant illumination when the source 13 is lighted. However, it often may be desirable that a limited adjacent illumination be provided simultaneously with the distant illumination. Especially this is the case when driving at high speed on a bad road, where it is of importance to avoid stones, holes and other irregularities before the tires of the car. If the illumination is adjusted for distant illumination, it is usually not possible in the dark to observe such irregularities. It may for that reason be suitable to provide a fainter source of adjacent illumination light, which is lighted at the same time as the distant illumination. This latter source of light can be cut off when it is not required, as when the stronger adjacent illumination is provided. By experiments it has been found, that a suitable power of this dimmer adjacent illumination is one third of the power of the normal source of light for adjacent illumination or the source of light for distant illumination, the power of these two last named being suitably about the same.

In Fig. 2 another embodiment of the invention is shown. Within a shell 38 the reflector 39 shaped as an ellipsoid together with its source of light 40 as well as the parabolic reflector 41 together with its source of light 42 are mounted. The two sources of light are two different incandescent lamps. For the rest the arrangement is the same as shown in Fig. 1, and for that reason the same reference numerals have been used for similar parts.

In Fig. 3 an incandescent lamp is shown, intended for creating the light to be reflected by a reflector according to Fig. 1. The incandescent lamp includes a base 27 and a glass bulb 28 fixed to the base. Within the glass bulb a screen 29 is mounted, being provided with three cup shaped depressions 19, 20 and 30. The cup shaped depressions 19 and 20 contain the incandescent filaments, forming the two sources of light 13 and 14 in the arrangement according to Fig. 1. The cup shaped depression 30 contains an auxiliary incandescent filament 31 with lower power than either of the other incandescent filaments, and intended for adjacent illumination, this filament being switched in together with the filament 13 for distant illumination. One end of all of the incandescent filaments is fixed to the metallic screen 29, which is connected to the metallic covering of the base by means of a supporting rod 32. The other end of incandescent filament 14 is connected by means of wire 33 to one of the bottom contacts 34 of the base, whereas the other ends of incandescent filaments 13 and 31 are connected to the other bottom contact 37 by means of wires 35 and 36, respectively. In this case the incandescent filaments 31 and 13 will always be lighted together. If in case this should not be desirable, a third bottom contact may be provided, and the two incandescent filaments 13 and 31 may be connected to separate bottom contacts.

While I have described more or less specific embodiments of my invention, it is to be understood that this has been done for the purpose of illustration only and that the scope of my invention is not to be limited thereby, but is to be determined by the appended claims.

What I claim is:

1. In a headlight, an upper ellipsoidal reflector, a lower parabolic reflector, a first source of light located at substantially the posterior focus of said ellipsoidal reflector, whereby light reflected therefrom is converged, a second source of light located substantially at the focus of said parabolic reflector, whereby substantially parallel rays are reflected, screening means for preventing light from said first source from reaching said parabolic reflector and for preventing light from said second source from reaching said ellipsoidal reflector, a third source of light of substantially less intensity than said first and second sources located above said screening means so that the light therefrom reaches only said ellipsoidal reflector, and screening means for preventing emission from the headlight of any direct rays from said first and third sources of light.

2. In a headlight, an upper ellipsoidal reflector, a lower parabolic reflector, a first source of light located at substantially the posterior focus of said ellipsoidal reflector, whereby light reflected therefrom is converged, a second source of light located substantially at the focus of said parabolic reflector, whereby substantially parallel rays are reflected, screening means for preventing light from said first source from reaching said parabolic reflector and for preventing light from said second source from reaching said ellipsoidal reflector, a third source of light of substantially less intensity than said first and second sources located above said screening means so that the light therefrom reaches only said elliptical reflector, screening means for preventing emission of any direct rays from said first and third sources of light, and means for independently controlling said first and second sources of light and for controlling said third source together with said second.

3. In a headlight, an upper ellipsoidal reflector, a lower paraboloidal reflector, said reflectors having a common major axis, a source of light at the posterior focus of the ellipsoidal reflector, another source of light at the focus of the paraboloidal reflector, an opaque screen generally coinciding with said major axis for preventing rays from the first named source of light from reaching the paraboloidal reflector and for preventing rays from the second named source of light from reaching the ellipsoidal reflector, another opaque screen extending forwardly from the upper reflector and being inclined downwardly with its forward lower edge substantially in the plane of the first mentioned opaque screen and cutting off all direct light rays from the first named source of light but not interfering with the light rays from the second named source of light, said downwardly inclined opaque screen being so shaped and so spaced from the forward end of the lower reflector that light reflected from the upper reflector may emerge from the headlight below the downwardly inclined opaque screen.

4. The invention according to claim 3 wherein the downwardly inclined opaque screen has an ellipsoidal reflecting surface where exposed to the source of light for the upper reflector, and a translucent panel is located between the forward edge of the upper reflector and the forward edge of the lower reflector and transmits substantially all the light reflected from the upper reflector.

AXEL EMIL BERGSTRÖM.